United States Patent [19]

Kusada

[11] 4,137,998
[45] Feb. 6, 1979

[54] OIL CHANGE NOZZLE

[76] Inventor: Rokutaro Kusada, 7-9, 7-chome, Takadono, Asahi-ku, Osaka-shi, Osaka-fu, Japan

[21] Appl. No.: 829,097

[22] Filed: Aug. 30, 1977

[30] Foreign Application Priority Data

Sep. 9, 1976 [JP] Japan .......................... 51-121856[U]

[51] Int. Cl.² ........................ F16N 3/02; F01M 11/04
[52] U.S. Cl. ................................... 184/14; 184/1 R; 184/105 A
[58] Field of Search ................... 166/186, 187, 191; 184/15 A, 105 B, 105 A, 105 C, 14, 1 R

[56] References Cited

U.S. PATENT DOCUMENTS

| 2,235,897 | 3/1941 | Moore | 184/105 A |
| 2,588,026 | 3/1952 | Martin | 184/14 |
| 2,607,424 | 8/1952 | Taylor | 166/186 X |
| 2,607,425 | 8/1952 | Taylor | 166/186 X |
| 2,818,120 | 12/1957 | Whitton | 166/191 X |
| 3,180,533 | 4/1965 | Sundholm | 184/105 B X |
| 3,876,003 | 4/1975 | Kisling | 166/187 X |

FOREIGN PATENT DOCUMENTS 392231  1/1971  U.S.S.R. .................................. 166/191

Primary Examiner—David H. Brown

[57] ABSTRACT

An oil change nozzle used particularly for guide rollers or the like on caterpillared vehicles. Two inflatable tubes mounted on the nozzle are inflated by the oil under pressure into a sealing contact with the inner wall of a hole in the shaft in such rollers. Old oil is pushed out by new oil with no possibility of mixing with new oil.

1 Claim, 5 Drawing Figures

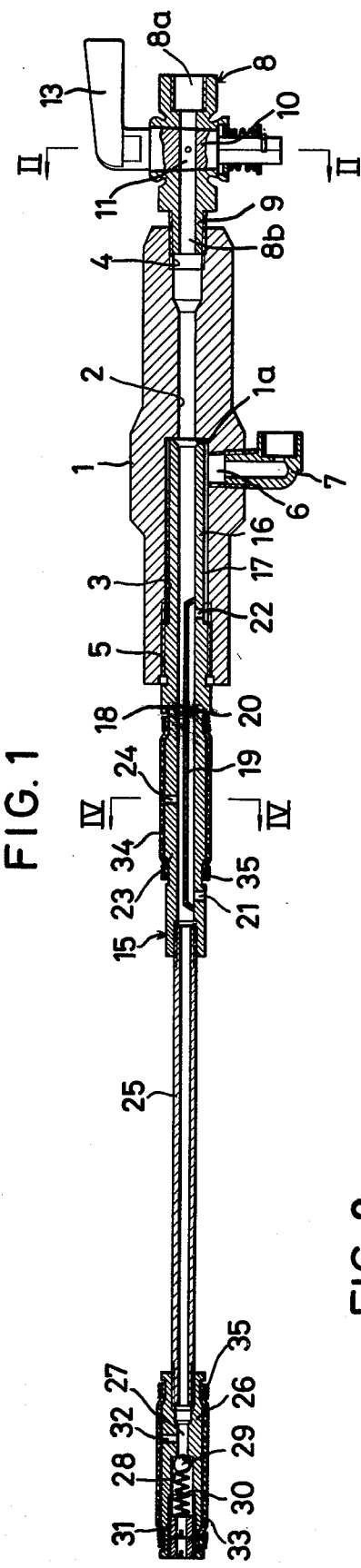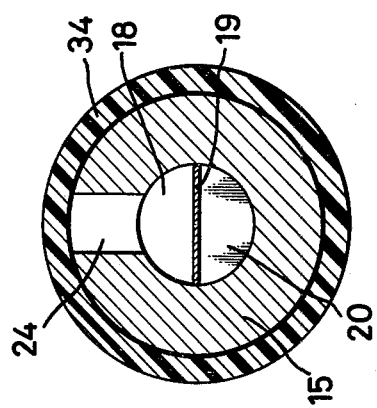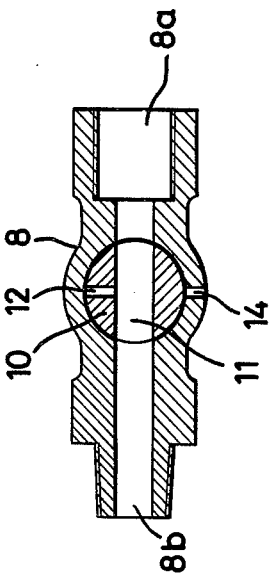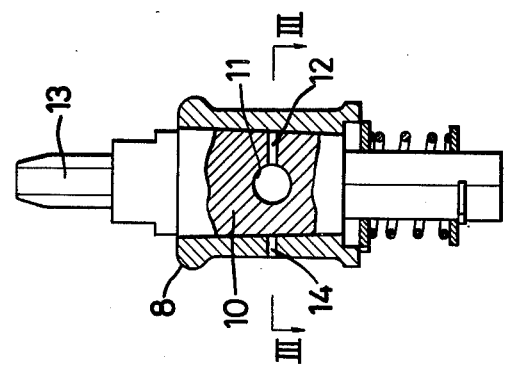

OIL CHANGE NOZZLE

This invention relates to an oil change nozzle or tool used for the change of lubricating oil particularly for the shafts of guide rollers on vehicles with a caterpillar such as bulldozers.

A conventional manner for changing oil in such rollers was to first tilt them to drain old oil and return them back to their normal position and fill them with new oil. This required much time and labor.

An object of this invention is to provide an oil change nozzle convenient to use and compact in size.

Other features and advantages of this invention will become apparent from the following description with reference to the accompanying drawings in which:

FIG. 1 is a vertical sectional view of the oil change nozzle according to the present invention;

FIG. 2 is a sectional view taken along the lines II—II of FIG. 1, showing the cock in its open position;

FIG. 3 is a horizontal sectional view of the cock;

FIG. 4 is a vertical sectional view taken along the lines IV—IV of FIG. 1; and

Figure 5:
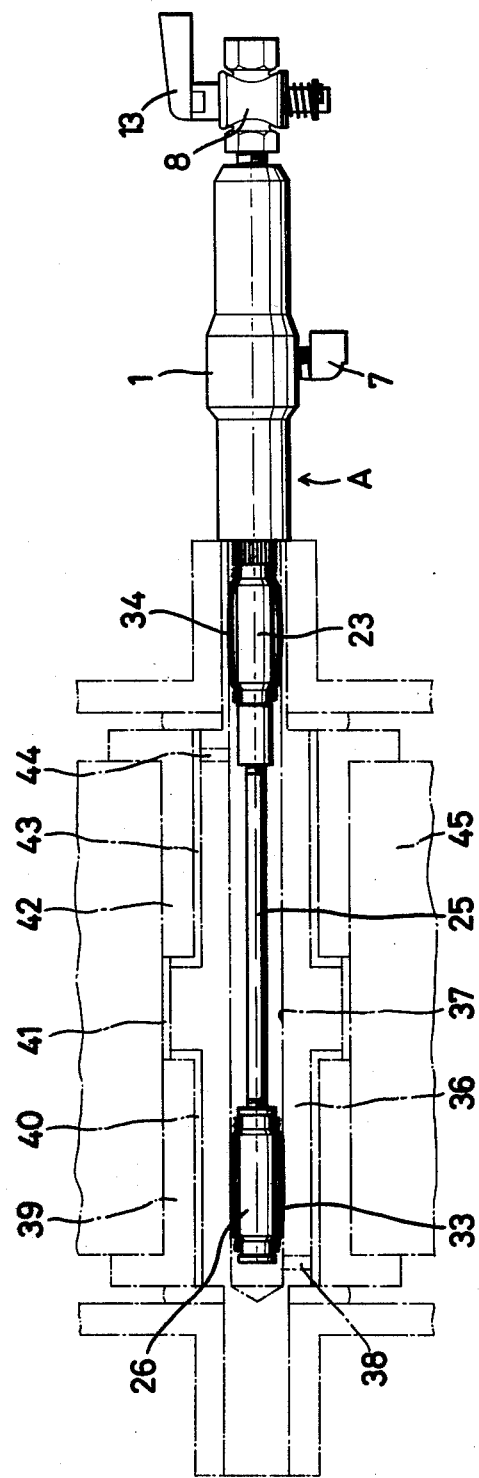
FIG. 5 is a diagrammatic view, partly in section, showing how the oil change nozzle of the present invention is used.

Referring to the drawings, a nozzle body 1 is provided with a center hole with a shoulder 1a to form a smaller diameter hole 2 and a larger diameter hole 3. These holes are internally threaded at their ends 4 and 5. An oil drain port 6 is radially formed in the wall of the nozzle body 1 so as to communicate with the larger diameter hole 3. A hose connector 7 is screwed into the port 6.

Into the internally threaded end of the smaller diameter hole 2 is screwed a tubular end 9 of a cock 8. A stopper 10 mounted in the cock has an oil supply passage 11 extending therethrough and an oil drain passage 12 radially extending at a right angle to the passage 11.

The stopper 10 is rotatable up to 90 degrees with respect to the cock. When a knob 13 on top of the stopper 10 is in alignment with the axis of the cock 8, the oil supply passage 11 communicates with the inlet 8a and the outlet 8b of cock. When the knob is at a right angle to the axis of cock, the outlet 8b of cock communicates through the oil drain passage 12 and part of the oil supply passage 11 with an oil drain port 14 formed in the cock.

Into the internally threaded end of the larger diameter hole 3 is screwed a center pipe 15 until its rear end bears on the shoulder 1a. A rear portion 16 of the pipe 15 has a smaller outer diameter than the inner diameter of the larger diameter hole 3 to form an annular passage 17 therebetween, said passage communicating with the oil drain port 6.

The center pipe 15 has an oil supply passage 18 which communicates with the smaller diameter hole 2 in the nozzle body. A partitioning plate 19 having substantially the same width as the diameter of the passage 18 is inserted into the passage 18. The plate 19 is shaped so as to be arcuate at each end thereof and said arcuate ends are turned down into close contact with the inner wall of the passage 18 to form an oil drain passage 20 partitioned by the plate 19.

The oil drain passage 20 has an inlet 21 and an outlet 22 at each end thereof in the center pipe 15, said outlet communicating with the annular passage 17.

The center pipe 15 has an enlarged portion 23 projecting from the nozzle body 1. In said portion is formed a radial passage 24 which extends from its outer periphery to the oil supply passage 18.

Into the front end of the pipe 15 is screwed a connecting pipe 25, on the front end of which an end pipe 26 is screwed. The end pipe is provided with a smaller diameter hole 27 and a larger diameter hole 28 extending therethrough. In the latter hole are mounted a check valve 29 and a spring 30 biasing the check valve toward the smaller diameter hole 27. The spring has its other end bearing on a tubular nut 31 screwed into the front end of the end pipe 26. A radial passage 32 is formed in the end pipe 26 to extend from the outer periphery to the reduced hole 27.

Tubes 33 and 34 are mounted on the end pipe 26 and the enlarged portion 23 of the center pipe 15, respectively, and are tightly bound thereon with cords 35 at each end thereof so as to be oil-tight. These tubes are made of a synthetic resin material which is inflatable under the pressure of oil.

In operation, the front end of the oil change nozzle generally designated by letter A is inserted into a hole 37 in a shaft 36 of a guide roller 45 as illustrated in FIG. 5. The knob 13 is turned to open the cock 8 and a lubricating oil is forced into the inlet 8a with a hand pump or the like. The oil will flow through the cock 8, the smaller diameter hole 2, the oil supply passage 18 and the connecting pipe 25 into the smaller diameter hole 27.

Simultaneously the oil under pressure flows through the radial passages 32 and 24 into the tubes 33 and 34, respectively, to inflate them into close contact with the inner wall of the hole 37. This prevents the oil change nozzle from coming out of the hole 37 and keeps the area between the tubes air-tight and oil-tight.

The oil under pressure in the smaller diameter hole 27 in the end pipe 26 eventually opens the check valve 29 against the resilience of the spring 30, flowing out of the end pipe 26 into the hole 37.

Since the tube 33 has sealed up the hole 37, the oil flows through a radial passage 38 in the shaft 36 and a passage 40 between the shaft 36 and a bushing 39 into an oil reservoir 41, pushing the old oil therefrom.

The old oil flows through a passage 43 between the shaft 36 and a bushing 42 and a radial passage 44 in the shaft 36 into the hole 37 between the inflated tubes 33 and 34. Since the hole 37 has been sealed by the tubes, the old oil flows through the inlet 21, the oil drain passage 20, the outlet 22, the annular passage 17 and the drain port 6 out of the oil change nozzle A.

After the oil has been changed, the knob 13 is turned 90 degrees to close the cock. This enables the oil in the nozzle A to flow out of the nozzle through the oil drain passage 12, part of the oil supply passage 11 and the oil drain port 14. When the oil flows out, the tubes 33 and 34 will become deflated to the original state as in FIG. 1, enabling the oil change nozzle to be pulled out of the shaft 36 of the guide roller.

Since the tubes 33 and 34 are inflated by the new oil supplied, no source of compressed air is needed to inflate them. All that is needed is to insert the oil change nozzle and supply the oil under pressure. There is also no possibility of new oil mixing with old oil.

What is claimed is:

1. An oil change nozzle comprising:
   a body having a shouldered center hole to form a smaller diameter hole and a larger diameter hole,
   a pipe having one end screwed in said larger diameter hole in the body to form an annular passage between a smaller diameter end thereof and the inner wall of said larger diameter hole, two inflatable tubes mounted on said pipe spaced from each other and having each end sealed so as to be oil-tight, said pipe having first and second radial passages to inflate said two tubes with oil under pressure to seal the area between said two tubes, a check valve provided in said pipe at the end thereof opposite the end in said body, the interior of said pipe being longitudinally partitioned to form an oil supply passage and an oil drain passage, said pipe having third and fourth radial passages communicating with said oil drain passage, said fourth radial passage communicating with said annular passage, and said body having an oil drain port communication with said annular passage.

* * * * *